United States Patent Office 2,733,990
Patented Feb. 7, 1956

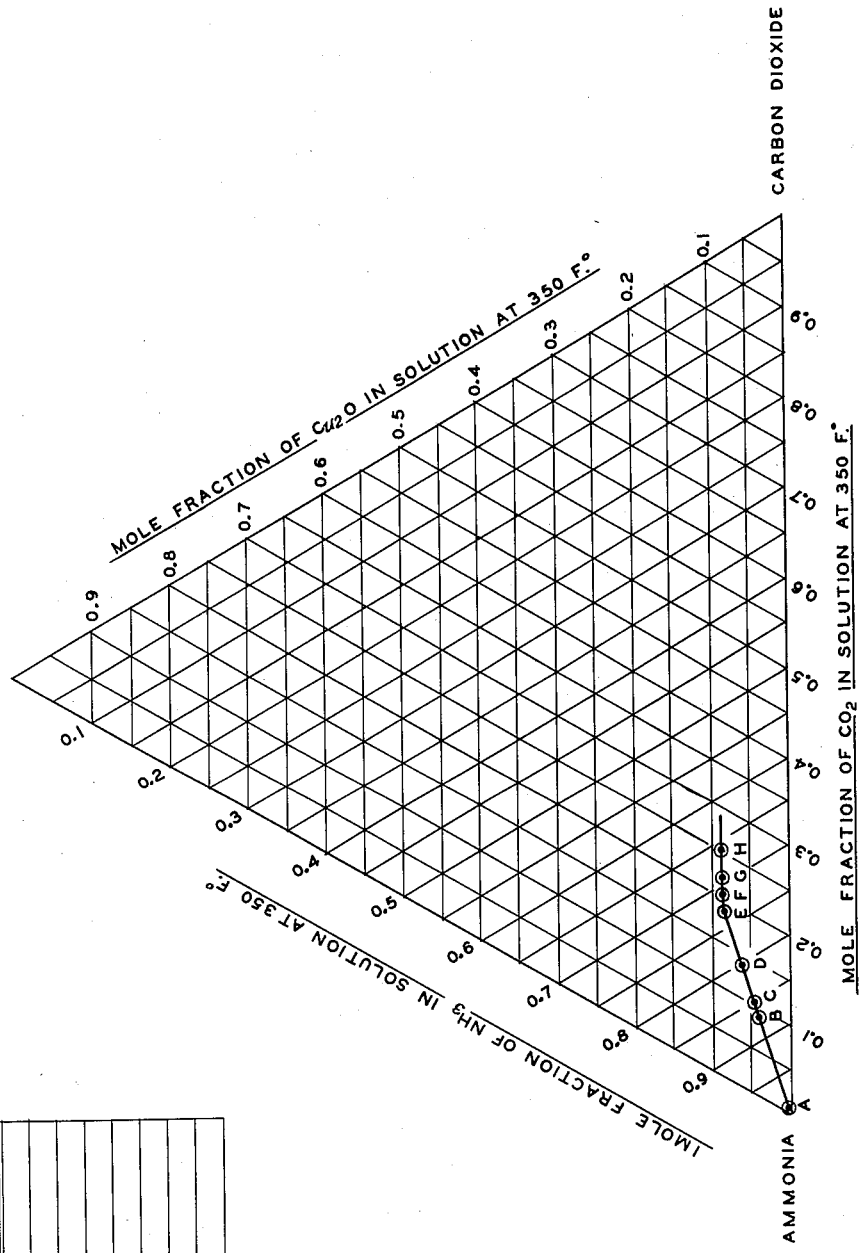

2,733,990

METHOD OF PRECIPITATING METALS IN METALLIC FORM FROM AMMONICAL AMMONIUM SALT SOLUTIONS

George Van Hare, Brooklyn, and Richard Montgomery, New York, N. Y., assignors to Chemical Construction Corporation, New York, N. Y., a corporation of Delaware Application October 17, 1952, Serial No. 315,341

13 Claims. (Cl. 75—108)

This invention relates to the production of powdered, non-ferrous metal, usually copper, by treating with reducing gas an aqueous solution of a compound of such metal at elevated temperature under super-atmospheric pressure. More particularly, the improvement is directed to pretreating the solution by a process of preheating, in the absence of reducing gas, to approximately such temperature, removing any precipitate formed during the heating period or shortly thereafter and only then introducing a reducing gas.

Ores, ore concentrates, secondary metals and other commercial sources of non-ferrous metals usually contain a variety of metal values whose recovery and/or purification by known methods is difficult. One such method heretofore proposed employs some selective solvent for a particular metal-bearing component followed by treatment of resultant solution with reducing gas at elevated temperature and pressure to precipitate desired metal in elemental form. Various acidic and ammoniacal solutions have been proposed as solvents for this method. In some cases acceptable results have been obtained.

Unfortunately, however, the solvent action is never perfectly selective. Various amounts of impurities may also dissolve from the original source material. When subjecting resultant solution in the presence of a reducing gas to the necessary temperature to precipitate product metal, such product is often contaminated by co-precipitated metal and/or metal compounds. Often this will result in products whose purity and properties are deficient as to standard.

It is, therefore, a primary object of the present invention to substantially reduce or prevent such contamination. In view of the trouble such contamination has caused, its elimination by the process of the present invention is surprisingly simply accomplished.

Operational step in the improved process of the present invention are simple and few. The process involves pretreating an aqueous solution of metal compounds, from which product metal is to be precipitated. The solution is preheated, in the absence of reducing gas, to some temperature above its normal boiling point. Surprisingly, it has been found that those contaminants such as those noted above which in the past caused trouble by precipitating during normal reduction operations, or the sources of these contaminants, are by this step caused to form a filterable precipitate. Resultant precipitate, in accordance with the present invention, is separated from solution by filtration or some mechanically equivalent expedient. Such treatment not only clarifies the solution but stabilizes it for some time against contaminant precipitation by further heating in the absence of gas and during product metal precipitation. Clarified and stabilized solution is then subjected to reduction at elevated temperature and pressure in a normal manner, and the product metal is surprisingly free from undesirable contaminants.

In general, the present invention is concerned with production and/or recovery of those metals between silver and cadmium, inclusive, in the electromotive force series and which are capable of forming in solution a soluble complex with $NH_3$. Such metals can be precipitated in elemental form from solutions of compounds thereof by treatment under superatmospheric temperature and pressure conditions with a suitable reducing gas such as carbon monoxide or hydrogen. The improved process of the present invention is particularly applicable to the production of copper, nickel and cobalt. Difficulties with precipitated contaminants encountered in attempting previously suggested practices and which are solved by the present invention, are readily illustrated in the production or recovery of these metals. The application of the process to one such metal, copper for example, therefore will be discussed in somewhat greater detail for illustrative purposes.

The problems solved by the present invention are encountered in conjunction with various solutions of differing types of compounds of the metals. These solutions may have hydrogen ion concentrations in acidic, basic or substantially neutral ranges. Moreover, the compounds of the metals may be simple or complex salts of various acid radicals. However, for practical purposes, carbonates and sulfates will be the salts most commonly encountered. For the illustrative metal, copper, the difficulties are most pronounced in the treatment of ammoniacal ammonium carbonate leach liquors. Accordingly, to further simplify present discussion, the illustrative case will be taken as found in the commercial production of copper, using ammoniacal-ammonium carbonate leach liquors.

In the practice of the present invention, as applied to the illustrative case, some copper-bearing material, such as a concentrate of an oxidized copper ore, or an alloy such as brass, bronze or the like, is leached with an ammoniacal-ammonium carbonate liquor. For effective leaching, the liquor must contain some cupric ions. In practice, therefore, a portion of the leaching liquor is continually circulated through some oxidizing circuit of sufficient capacity to maintain the cupric-cuprous ratio in the liquor at an effective leaching level. However, the actual leaching operation steps per se do not form part of the present invention. Whatever the leaching circuit, the resulting solution is one of complex copper and ammonium carbonates.

In addition to complex metal-ammonium compounds, resultant pregnant leach solutions will also contain uncombined ammonia and ammonium carbonate. In the illustrative case of recovering copper from copper-bearing scrap and the like, other metals or metal compounds may be present. Almost any metal, if present, will be dissolved to some extent. In general, however, only copper and zinc if zinc is present will be dissolved to an extent approaching complete extraction. Much if not most of the other contaminants, such as tin, lead, manganese, silica, and the like contained in the source material remain in the leaching tank as an undissolved sludge due to their lower solubilities and/or solution rates. If so desired, this sludge may be removed and further treated. Nevertheless, pregnant leach solution will contain appreciable amounts of dissolved metals or metal compounds. Usually there are sufficient amounts of them to cause, on attempted copper recovery by direct gas reduction, the precipitation of a metal product in which the contaminant content will be excessive.

It is the elimination of much or all of this extraneous metal or metalloid content with which the present invention is concerned. Zinc, if present, can be separated from copper by a procedure which is not part of this invention. For example, one such process is shown in U. S. Patent No. 2,695,843 to George Van Hare, one of the present inventors, jointly with P. J. McGauley and F. A. Schaufelberger. Therefore, so far as copper recovery by the present invention is concerned, it is not primarily concerned with its separation from zinc.

Tin, lead and manganese are noted in the present discussion and claims as specific impurities removed by the present process in copper production. These are illustrative only and other metals or metalloids may be found, particularly when the process is used in producing or recovering other metals such as nickel, cobalt, cadmium, silver or mercury. Silica, also noted above, is often found.

It should be noted also that while the impurities are referred to in the specification and claims as dissolved metals, materials such as metalloids are intended to be included. Moreover, all the contaminants may not be taken up in the liquor during leaching as true solutions of dissolved salts. Some of the material is frequently found in colloidally suspended form of sufficient stability to be treated as solvated. Lead, for example, which has a low solubility as carbonates, is frequently carried by the liquor in amounts far greater than its solubility limits would indicate. It is an advantage of the present invention that these suspended materials, which cannot be removed by normal clarification means, are also precipitated and removed.

In many cases, the first actual step will be an adjustment of the solutes content of the liquor. This is done not only for the purposes of the present process but to obtain, as a result of the present process, a liquor in suitable condition for the subsequent precipitation of copper, or other metals as the case may be. However, discussion of the adjustment is more readily developed in considering the actual heating and clarifying steps. Accordingly these steps will be taken up first.

The present discussion will be made with reference to the accompanying drawing which contains a three component diagram of ideal solute conditions at 350° F., and a table of representative values thereon.

Of a primary importance in the present invention is the step of raising the temperature of the leach liquor in the absence of the reducing gas. Several factors should be considered in this connection. Among these are: the method of heating, the temperature to which liquor should be raised, the rate of heating, and the period over which the solution should be held at the temperature.

The physical means used for heating is not particularly critical. For example, pregnant liquor may be passed through a suitable heat exchanger in withdrawing liquor from the leaching circuit. Alternatively, it may be done in a special pressure vessel provided for the purpose. This even may be the pressure vessel in which the subsequent precipitation of metal is done. However, this is not especially convenient because it would require withdrawal for clarification and subsequent return thus limiting the operation to batchwise treatment, a limitation not necessarily imposed by the other alternatives.

The temperature to which liquor is heated is dependent upon external circumstances. In addition to purification, one purpose in heating is to raise the temperature of the solution to approximately that of subsequent metal reduction. Accordingly, liquor is heated to some temperature above its atmospheric boiling point, this being required to precipitate contaminants, but not ordinarily exceeding that temperature at which reduction will take place subsequently.

Pressure is required in order to reach the desired temperature. However, during metal reduction, a part of the total pressure will be accounted for by reducing gas partial pressure. Gas reduction usually will take place at above about 100 p. s. i. g. (pounds per square inch gauge) and usually between about 300 and about 500 p. s. i. g. Pressures up to 1000 p. s. i. g. may be used but are usually unnecessary. Pressure used during preheating, then, will be somewhat lower. In general, a preheating temperature above about 250° F. to about 500° F., usually from about 325° F. to 400° F., will constitute a good average. Higher temperatures may be used, but being higher than necessary for most cases will usually be avoided as unduly increasing the requirements for the necessary pressure vessel.

Heating should be done fairly rapidly. It is undesirable to hold the liquor at the heated temperature for too long a period. To do so may induce metal oxide precipitation, depending somewhat on the dissolved content. Solutions containing up to about 200 grams per liter of cuprous plus cupric copper can be prepared at ambient conditions. However, the total copper solubility decreases at higher temperatures. Amounts above about some 130 to 140 grams per liter will ordinarily precipitate as copper compounds, usually an oxide, on heating. In general, then, liquor before heating should contain not more than 150 grams per liter, usually 135 grams or less.

A further consideration is the time factor. If liquor is held at the elevated temperature for an excessive period, cuprous copper, being less soluble than cupric tends to precipitate. Usually as an oxide, cuprous compounds begin to precipitate after about 10–15 minutes. Precipitation will continue with continued heating down to a residual cuprous content of about 90 grams per liter.

In summation, then, the temperature should be raised as rapidly as possible to a suitable temperature, 350° F. being a good average illustrative value. Subsequent clarification also should be carried out within a period of some 1–15 minutes, if possible.

Preheating, according to this invention, will result in the precipitation or coagulation and precipititation of suspended material either as metal or metal compounds in a filterable form. It will occur to a sufficient degree that the liquor, clarified by removal of the precipitate will be adequately stable to give excellent metal production on subsequent reduction. For example, it will result in the precipitation of a sufficient amount, if not substantially all, of the tin, lead, manganese, silica and related impurities which may have gone into solution during leaching.

Advantageously, clarification is carried out at substantially the preheated temperature. As noted above, this will be substantially or slightly less than the desired temperature at which the solution will be subjected to treatment with reducing gas. While any step mechanically equivalent to filtration may be used for clarification, filtration is probably the simplest and preferred. Various types of filters may be employed. It has been found that a polishing or micro-filter, such as a porous plate having pores some 25 microns or less in diameter is desirable. Whatever the type, filtration is preferably carried out under super-atmospheric pressure with as little loss of sensible heat as is possible. Usually this will be up to about 400 lbs. pressure or more, i. e., that used during preheating.

Under some circumstances, as when scrap or oxide ore concentrates containing silica are being leached, it is desirable to remove the bulk of the coagulated impurities by filtration with a sand filter or the like. Partially clarified liquor is then sent through the polishing filter. Filter aids such as fuller's earth and its equivalents may be used if so desired.

As was noted above, if the dissolved cuprous content is too high, copper oxide is precipitated during preheating. Excessive precipitation not only tends to clog the filters but represents product copper losses. To avoid this situation, it is desirable to adjust the molar concentrations of ammonia, ammonium salts and metal in the leach liquor before preheating. As was noted above, actually this is the first operation in the present process, a check on the molar concentrations and if necessary an adjustment. The dissolved constituents should be adjusted to about the optimum for each for optimum retention of metal, in the illustrative case cuprous copper, in solution.

A discussion of these optima perhaps can be more readily followed by reference to the accompanying drawing. The latter is plotted on a tri-axial graph to show optimum proportions at the average illustrative 350° F. temperature. It will be seen that the optimum conditions, shown by the curve, must be taken from only a small range of the possible different proportions.

On the graph, the curve or line shows the relative concentrations at about 350° F. of $CO_2$, including carbonate ions; $NH_3$, including ammonium ions; and copper, calculated to cuprous oxide, in various ammoniacal copper-ammonium carbonate solutions when the dissolved cuprous content is just at the saturation point. The mol percentages, or fractions, plotted on the critical line are therefore based on the total mols of $NH_3$, $CO_2$ and $Cu_2O$ per liter of leach liquor and effectively, the line is a solubility curve at about 350° F. for cuprous oxide in ammoniacal, copper-ammonium carbonate solutions.

When the composition of the liquor to be treated is so adjusted that mol percentages of the noted constituents lie substantially on the curve, little or no copper oxide will be precipitated on heating. Such adjusted solutions may be preheated to substantially the temperature at which gas reduction will be carried out with little or no copper loss. Also they can be filtered within a reasonably short time, say 10 to 15 minutes as noted above without any additional loss.

However, in order to avoid a tendency for copper oxide to appear during subsequent precipitation of product copper metal powder, the solutes contents should fall substantially on or just below the critical curve. The molar percentages should not be too far below the curve. Liquor of such contents may on gas reduction tend to produce plating.

Solutions whose compositions lie substantially above the curve should also be avoided. They have a tendency during gas reduction to give a copper product whose physical properties are poor from the standpoint of density. Again, also the purity of the product is exceedingly difficult to maintain. Since the maximum solubility of copper in cupro-ammonium carbonate solutions at 350° F. is about 135–136 grams per liter, it is not desirable to build up the copper concentration in excess thereof during leaching. Such excess, as noted above, simply will be precipitated as oxide on heating to 350° F. Obviously somewhat higher copper concentrations may be utilized at lower preheating temperatures, for example 200°–300° F. However, the contaminant precipitating tendency is also much less in that range and is less desirable than the 325°–450° F. range noted above. Conversely, for preheating above 350° F., the optimum total copper content for leaching will be somewhat lower.

Specific points on the curve and in the table represent the approximate maximum solubility of cuprous copper in adjusted solution at the particular points, i. e., just below the saturation point. Accordingly, heating can be carried out in a heat exchanger autoclave or the like without fouling the heating surfaces with precipitated oxides.

It should be noted that absolute concentrations in grams per liter of Cu, $CO_2$ and $NH_3$ in solution cannot be obtained per se from the graph because a fourth component, water, is not shown. A curve must be three dimensional to account for the water component. Since the mol percentages of water do not in general vary greatly with the solubility limits shown, usually less than 5% variation, this component may be reasonably ignored in actual practice.

By making this assumption, sufficiently accurate concentrations, in grams per liter, of $CO_2$ and $NH_3$ for the various adjusted solutions can be readily calculated. This may be done by equating the copper concentration value at any maximum copper solubility point, on the critical line and in the accompanying table to the corresponding mol fraction value on the $Cu_2O$ scale for that particular point on the critical line.

For copper concentrations intermediate those shown, interpolation is made to locate such points between known values on either side of them on the critical line. This will permit calculation of the carbon dioxide and ammonia concentrations for such intermediate values. While concentration values on the curve do not vary at uniform rate, such interpolations have been found to give reasonably accurate results.

If an arbitrary $Cu_2O$ concentration in grams per liter is selected and placed arbitrarily anywhere upon the critical line, and if the proper $CO_2$ and $NH_3$ concentrations required for that particular point on the line to keep copper in solution are calculated and used, any dissolved copper in excess of the amount shown by the curve at that point on heating to 350° F. will precipitate out as copper oxides. Some $CO_2$ and $NH_3$ will vaporize from the solution into the gas phase. However, in general the relative mol fraction composition of the solution will slide along the curve toward the point of greatest copper solubility because the relative mol fraction values of $CO_2$ and/or $NH_3$ in the solution will be increased by precipitation of the excess copper. Thus, liquor at 350° F. will come to some equilibrium condition on the critical line. It will remain thereon even though shifting its position along the line. Therefore, any solution, adjusted or not, may be processed according to the present process if the possible excessive precipitation of copper is ignored. Adjustment will minimize this loss.

Accordingly, it may be said that the absolute concentration values for a particular temperature are limited by maximum solubilities and vapor pressures of the compounds in such solutions, i. e., the cupro-complex compounds, ammonium carbonate, ammonium hydroxide, etc. Advantageously, in the liquor the adjusted concentrations of the three plotted components should be such that the relative mol percentages fall on the critical line. For the illustrative case, copper solutions at 350° F., it will be found at the same time that the absolute concentrations of these components fall within the following approximately optimum leach liquor composition ranges.

*Leach liquor composition*

| Dissolved component | Concentration (gms./liter) |
|---|---|
| Carbon dioxide | 100–160 |
| Ammonia | 160–190 |
| Total copper | 125–135 |

In using the graph, it is assumed that all the copper is in solution as cuprous oxide. Since cuprous oxide is slightly less soluble than cupric oxide at the operating temperatures, the most unfavorable solubility conditions are assumed and allowed for. If, as is normally expected, some of the copper is present in the cupric condition, a margin of safety is thereby allowed.

Metallic copper, powder produced by gas reduction from adjusted, preheated and clarified solutions will consistently meet powder metallurgy and electrolytic grade specifications. Powder is consistently obtained which is equal to or better than such specifications. For example, as to powder metallurgy requirements, copper powder is readily produced having an apparent density of 2 to 3 grams per milliliter and a "Hall flow-rate" of 30 to 35 seconds maximum; as to electrolytic requirements it has a copper content of at least 99.9% and a maximum electrical resistivity (at 20° C.) of 0.15328 international ohm/per meter per gram.

In general, adjustment of the leach liquor composition prior to preheating can be carried out at any point in the process. It may be done in any of several possible ways. Preferably, although not necessarily, $CO_2$ adjustment is achieved prior to the leaching operation by heating the cupro-ammonium carbonate liquor that is being recycled as leach liquor from a previous cycle. This is done to drive off any excess $CO_2$ which may have become dissolved during precipitation of copper with carbon monoxide during metal precipitation. $CO_2$ may be added at some point in the leaching if necessary.

$NH_3$ concentration also may be adjusted prior to leaching by adding $NH_3$ if needed, or by driving off $NH_3$ by heating at the same time excess $CO_2$, if any, is removed. $NH_3$ concentration also may be adjusted by addition to the liquor during leaching.

While the above-described adjustments are to minimize cuprous oxide precipitation during preheating, the principles are applicable to any type of leach liquor. When leach liquor having a zinc content of more than 10% by weight, for example, is adjusted there should be a sufficient amount of ammonia and carbon dioxide, over and above the adjusted amount necessary for copper retention, according to the accompanying critical curve. This increased amount is used to complex and retain the zinc in solution. It has been found that while theoretically two moles of $NH_3$ and one mol of $CO_2$ per mol of zinc should be sufficient to complex all the zinc in solution, it is desirable to have some 6 to 8 mols of $NH_3$ and 1 to 2 mols of $CO_2$ per mol of zinc. These amounts should be in excess of the amounts of $NH_3$ and $CO_2$ adjusted to relative concentrations falling on the critical curve for the copper.

Liquor which has been adjusted, preheated and filtered in the above manner is charged to an autoclave and subjected to metal precipitation by the action of reducing gas. This latter is not a novel feature of the present invention. At least a part of the copper content is precipitated by introducing carbon monoxide or hydrogen gas into the autoclave and heating the leach liquor to 300° F., or higher and pressures up to some 900 lbs. per sq. in. or higher usually as noted above 400–500 p. s. i. g. Metallic copper products precipitated from leach liquors are removed, washed and dried. Not all of the copper should be precipitated in any one cycle. It is desirable to retain some cupro-ammonium carbonate to recycle as leach liquor. It is this recycle, which as noted above, may be adjusted before leaching. Moreover, an attempt at complete copper precipitation may result in precipitation of other products as contaminants, particularly when other metals such as zinc, for example, are in solution.

Repeated operation of the process of this invention has been carried out with quite different leach liquors. It has been shown that even with source material of widely varying compositions, sufficient tin, lead, manganese, silica and other impurities are removed by the steps of adjustment, where it is necessary, followed by pre-heating and filtration, to give a copper powder product having purity meeting the noted requirements. Residual leach liquor remaining after such impurities have been precipitated is stable at elevated temperatures up to the preheating temperature for sufficient time to permit steps of clarification and transfer to the reduction vessel. Liquor can be treated directly with reducing gas such as hydrogen, carbon monoxide or mixtures thereof, to produce good yields of copper powder whose particles have not agglomerated to any appreciable extent and therefore do not enclose objectionable amounts of impurities which cannot be removed by ordinary washing. Such copper powder will consistently fall within the specifications noted above.

We claim:

1. In precipitating in metallic form a metal lying between silver and cadmium in an electromotive series of elements, from an aqueous ammoniacal ammonium salt solution, said solution containing at ambient temperatures at least one such metal as a gas-reducible water-soluble complex with $NH_3$, by treating said solution with a reducing gas under super-atmospheric pressure and at an elevated reduction temperature above the normal boiling point of the solution at atmospheric pressure, said solution also containing at least one contaminant material in amount exceeding its maximum solubility at said reduction temperature, the improved procedure for stabilizing the solution and improving the product metal yield and purity which comprises: adjusting the ammonia and the ammonium salt content of said solution to produce maximum retention of said metal at said reduction temperature; preheating so-adjusted solution to an elevated temperature of from about 250° F. to about 500° F. in the absence of reducing gas and under a total pressure at least equal to the autogenous pressure at the temperature; separating therefrom resultant precipitate and only then subjecting so-treated solution to the action of said reducing gas.

2. In precipitating in metallic form a metal lying between silver and cadmium in an electromovtive series of elements, from an aqueous ammoniacal ammonium carbonate solution, said solution containing at ambient temperatures at least one such metal as a gas-reducible water-soluble complex with $NH_3$, by treating said solution with a reducing gas under super-atmospheric pressure and at an elevated reduction temperature above the normal boiling point of the solution at atmospheric pressure, said solution also containing at least one contaminant material in amount exceeding its maximum solubility at said reduction temperature, the improved procedure for stabilizing the solution and improving the product metal yield and purity which comprises: adjusting the $NH_3$ and the $CO_2$ content of said solution to produce maximum retention of said metal at a selected preheating temperature between about 250° F. and about 500° F.; heating so-adjusted solution to said preheating temperature in the absence of said reducing gas and under a pressure at least equal to the autogenous pressure at the temperature; separating therefrom resultant precipitate and only then subjecting so-treated solution to the action of said reducing gas, said precipitate separation and initiation of the gas reduction being carried out within the shortest practicable time.

3. In recovering a metal, said metal being capable of forming a gas reducible water-soluble complex with $NH_3$, and lying between silver and cadmium in an electromotive series of elements, from an aqueous solution of a compound of such metal by treating the solution with a reducing gas under super-atmospheric pressure and at a temperature elevated above the normal boiling point of the solution at atmospheric pressure to precipitate at least a portion of the dissolved metal in metallic form; the combination therewith of the improved method of stabilizing the solution and improving the product metal yield and purity which comprises: preheating such solution to an elevated temperature, said temperature being above 250° F. but below the temperature of the metal reduction, under a pressure at least equal to the autogenous pressure at the temperature prior to subjecting it to the action of the reducing gas, separating therefrom resultant precipitate and only then subjecting it to the action of the reducing gas, said precipitate separation and initiation of gas reduction being carried out within fifteen minutes after the solution has reached said elevated temperature.

4. In recovering a metal, said metal being capable of forming a gas reducible water-soluble complex with $NH_3$, and lying between silver and cadmium in an electromotive series of elements, from an aqueous solution of a compound of such metal by treating the solution with a reducing gas under super-atmospheric pressure and at a temperature elevated above the normal boiling point of the solution at atmospheric pressure to precipitate at least a portion of the dissolved metal in metallic form; the combination therewith of the improved method of stabilizing the solution and improving the product metal yield and purity which comprises: preheating such solution to an elevated temperature within 300° to 500° F., said temperature being above 250° F. but below the temperature of the metal reduction, under a pressure at least equal to the autogenous pressure at the temperature prior to subjecting it to the action of the reducing gas, separating therefrom resultant precipitate and only then subjecting it to the action of the reducing gas, said precipitate separation and initiation of gas reduction being carried out within the shortest practicable time.

5. In the process of precipitating copper in metallic form from an aqueous ammoniacal ammonium salt solution containing dissolved copper as a complex with $NH_3$, by treating said solution with a reducing gas under super-atmospheric pressure and at a reduction temperature elevated above the normal boiling point of the solution at atmospheric pressure, said solution also containing copper contaminants in amounts exceeding their maximum solubility at said reduction temperature; the improved method of stabilizing said solution and improving the product metal yield and purity which comprises: adjusting the $NH_3$ and the ammonium salt concentrations in the solution to provide maximum $Cu_2O$ retention at a selected preheating temperature in the range of from about 250° F. to about 500° F.; heating so-adjusted solution to said preheating temperature in the absence of said reducing gas while maintaining thereon a total pressure at least equal to the autogenous pressure at the temperature; separating therefrom resultant precipitate and only then subjecting so-treated solution to the action of said reducing gas.

6. In the process of precipitating copper in metallic form from an aqueous ammoniacal ammonium carbonate solution containing dissolved copper as a complex with $NH_3$, by treating said solution with a reducing gas under super-atmospheric pressure and at a reduction temperature elevated above the normal boiling point of the solution at atmospheric pressure, said solution also containing copper contaminants in amounts exceeding their maximum solubility at said reduction temperature; the improved method of stabilizing said solution and improving the product metal yield and purity which comprises: adjusting the $NH_3$ and the $CO_2$ content of the solution to provide maximum $Cu_2O$ retention at a selected preheating temperature in the range of from about 250° F. to about 500° F.; heating so-adjusted solution to said preheating temperature in the absence of said reducing gas while maintaining thereon a total pressure at least equal to the autogenous pressure at the temperature; separating therefrom resultant precipitate and only then subjecting so-treated solution to the action of said reducing gas.

7. A process according to claim 6 in which said precipitate separation and initiation of gas reduction is carried out within fifteen minutes after the solution has reached said preheating temperature.

8. A process according to claim 6 in which said solution prior to said adjustment is substantially saturated as to dissolved copper and in which said preheating temperature is from about 325° F. to about 400° F.

9. In precipitating copper in metallic form from an aqueous ammoniacal ammonium carbonate solution containing a water-soluble complex of copper with $NH_3$ by treating said solution with a reducing gas under super-atmospheric pressure and at a reduction temperature elevated above the normal boiling point of the solution at atmospheric pressure, said solution also containing copper contaminants in amounts exceeding the maximum solubility at said reduction temperature; the improved method of stabilizing the solution and improving the product metal yield and purity which comprises: adjusting the molar concentrations of $NH_3$ and $CO_2$ and copper in the solution so that the mol percentages of the constituents lie substantially on the curve shown in the drawing forming part of the accompanying specification, thereby adjusting the $NH_3$ and $CO_2$ contents to afford maximum $Cu_2O$ retention; heating so-adjusted solution in the absence of said reducing gas to a selected preheating temperature of from about 250° F. to about 500° F. under a total pressure at least equal to the autogenous pressure at the temperature; separating therefrom resultant precipitate and only then subjecting so-treated solution to the action of the reducing gas.

10. A process according to claim 9 in which the precipitate separation and initiation of gas reduction is carried out in the shortest practicable time after the solution has reached said preheating temperature.

11. A process according to claim 9 in which the precipitate separation and initiation of gas reduction is carried out within fifteen minutes after the solution has reached said preheating temperature.

12. In precipitating copper in metallic form from an aqueous ammoniacal ammonium carbonate solution containing a water-soluble complex of copper with $NH_3$ and substantially saturated in total dissolved copper by treating said solution with a reducing gas under super-atmospheric pressure and at a reduction temperature elevated above the normal boiling point of the solution at atmospheric pressure, said solution also containing copper contaminants in amounts exceeding the maximum solubility at said reduction temperature; the improved method of stabilizing the solution and improving the product metal yield and purity which comprises: adjusting the molar concentrations of $NH_3$ and $CO_2$ and copper in the solution so that the mol percentages of the constituents lie substantially on the curve shown in the drawing forming part of the accompanying specification, thereby adjusting the $NH_3$ and $CO_2$ contents to afford maximum $Cu_2O$ retention; heating so-adjusted solution in the absence of said reducing gas to a selected preheating temperature of from about 325° F. to about 500° F. under a total pressure at least equal to the autogenous pressure at the temperature; separating therefrom resultant precipitate and only then subjecting so-treated solution to the action of the reducing gas.

13. In precipitating copper in metallic form from an aqueous ammoniacal ammonium carbonate solution containing a water-soluble complex of copper with $NH_3$ and substantially saturated in total dissolved copper by treating said solution with a reducing gas under super-atmospheric pressure and at a reduction temperature elevated above the normal boiling point of the solution at atmospheric pressure, said solution also containing copper contaminants in amounts exceeding the maximum solubility at said reduction temperature; the improved method of stabilizing the solution and improving the product metal yield and purity which comprises: adjusting the $NH_3$ content at from 160–190 gms./liter and the $CO_2$ content at from 100–160 gms./liter to the molar concentration of $NH_3$ and $CO_2$ at which for the dissolved copper content in the solution the mol percentages of these constituents provide for maximum $Cu_2O$ retention; heating so-adjusted solution in the absence of said reducing gas to a selected preheating temperature of from about 325° F. to about 500° F. under a total pressure at least equal to the autogenous pressure at the temperature; separating therefrom resultant precipitate and only then subjecting so-treated solution to the action of the reducing gas.

References Cited in the file of this patent

UNITED STATES PATENTS

| | | |
|---|---|---|
| 1,472,115 | Clark | Oct. 30, 1923 |
| 1,686,391 | Muller et al. | Oct. 2, 1928 |